United States Patent
Shukla et al.

(10) Patent No.: US 11,044,484 B1
(45) Date of Patent: Jun. 22, 2021

(54) INTRA-ESTIMATION FOR HIGH PERFORMANCE VIDEO ENCODERS

(71) Applicant: XILINX, INC., San Jose, CA (US)

(72) Inventors: Mahesh Narain Shukla, Hyderabad (IN); Vijay Kumar Bansal, Hyderabad (IN); Pankaj Kumar Bansal, Hyderabad (IN); Sumit Johar, Hyderabad (IN)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/783,953

(22) Filed: Feb. 6, 2020

(51) Int. Cl.
| | |
|---|---|
| *H04N 19/186* | (2014.01) |
| *H04N 19/11* | (2014.01) |
| *H04N 19/159* | (2014.01) |
| *H04N 19/436* | (2014.01) |
| *H04N 19/122* | (2014.01) |
| *H04N 19/176* | (2014.01) |

(52) U.S. Cl.
CPC .......... *H04N 19/186* (2014.11); *H04N 19/11* (2014.11); *H04N 19/122* (2014.11); *H04N 19/159* (2014.11); *H04N 19/176* (2014.11); *H04N 19/436* (2014.11)

(58) Field of Classification Search
CPC .... H04N 19/186; H04N 19/159; H04N 19/11; H04N 19/122; H04N 19/436; H04N 19/176
See application file for complete search history.

(56) References Cited

U.S. PATENT DOCUMENTS

| | | | | |
|---|---|---|---|---|
| 2017/0332103 | A1* | 11/2017 | Moccagatta | H04N 19/61 |
| 2018/0220160 | A1* | 8/2018 | Lu | H04N 19/91 |

OTHER PUBLICATIONS

Kim et al. Block Partitioning Structure in the HEVC Standard; IEEE Transactions on Circuits and Systems for Video Technology, vol. 22, No. 12, Dec. 2012 (Year: 2012).*

* cited by examiner

*Primary Examiner* — Joseph W Becker
(74) *Attorney, Agent, or Firm* — Patterson + Sheridan, LLP

(57) ABSTRACT

An example method of encoding a video includes selecting blocks of pixels in a frame of the video, the blocks having luminance (Y) blocks, red color difference (Cr) blocks, and blue color difference (Cb) blocks; performing intra-estimation based on reconstructed pixels of at the blocks of pixels to generate predicted blocks and then subtracting the predicted blocks from the blocks of pixels to generate residual data, the residual data comprising respective residual data for the Y-blocks interleaved with respective residual data for the Cr-blocks and the Cb-blocks; and generating new reconstructed pixels using a pipeline of a video encoder by processing the residual data for the blocks.

20 Claims, 13 Drawing Sheets

US 11,044,484 B1

INTRA-ESTIMATION FOR HIGH PERFORMANCE VIDEO ENCODERS

TECHNICAL FIELD

Examples of the present disclosure generally relate to electronic circuits and, in particular, to intra estimation for high performance video encoders.

BACKGROUND

Video codecs, such as H.264, HEVC (High Efficiency Video Coding), VP9 and AV1, use a hybrid approach to get the high degree of compression. For example, inter prediction is done to exploit the temporal correlation between the frames and intra prediction to exploit the spatial dependencies. Transform is done to take advantage of co-relation that exists in residual signal. Because of multiple available coding choices, video encoders have an estimation stage, where estimation of cost for various Intra/Inter modes and transform choices are tested fora given block, also referred as Coding Unit (CU). After deciding the best choice, it is sent to the next module (encode stage), which does the actual encoding. A CU includes three different components Y, Cb, Cr, where Y is Luminance, Cr is red color difference and Cb is blue color difference. There are three different color formats generally supported in codecs, YCbCr 4:2:0, 4:2:2, and 4:4:4.

SUMMARY

Techniques for providing intra-estimation for high performance video encoders are described. In an example, a method of encoding a video includes: selecting blocks of pixels in a frame of the video, the blocks having luminance (Y) blocks, red color difference (Cr) blocks, and blue color difference (Cb) blocks; performing intra-estimation based on reconstructed pixels to generate residual data for the blocks, the residual data comprising respective residual data for the Y-blocks interleaved with respective residual data for the Cr-blocks and the Cb-blocks; and generating new reconstructed pixels using a pipeline of a video encoder by processing the residual data for the blocks.

In another example, a video encoder includes: an estimation circuit configured to receive video frames; an encoder circuit, coupled to the estimation circuit, configured to receive the video frames and output of the estimation circuit; and an intra-estimation pipeline configured to: select blocks of pixels in a frame of the video, the blocks having luminance (Y) blocks, red color difference (Cr) blocks, and blue color difference (Cb) blocks; perform intra-estimation based on reconstructed pixels to generate residual data for the blocks, the residual data comprising respective residual data for the Y-blocks interleaved with respective residual data for the Cr-blocks and the Cb-blocks; and generate new reconstructed pixels using a pipeline of a video encoder by processing the residual data for the blocks.

In another example, method of encoding a video includes: selecting blocks of pixels in a frame of the video, the blocks having luminance (Y) blocks, red color difference (Cr) blocks, and blue color difference (Cb) blocks; performing intra-estimation for a first intra-mode based on reconstructed pixels to generate first residual data for the blocks; performing intra-estimation for a second intra-mode based on reconstructed pixels to generate second residual data for the blocks; and generating new reconstructed pixels using a pipeline of a video encoder by processing the first residual data interleaved with the second residual data.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1A:
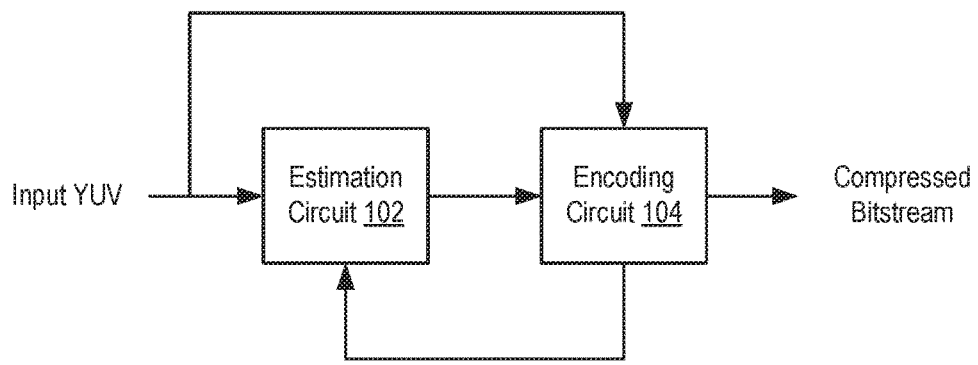
FIG. 1A is a block diagram depicting a video encoder according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

Techniques for intra-estimation processing for high performance video encoders are described. The techniques are provided for accelerating the video encoding pipeline processing. Most of the time, during intra block processing, some of the blocks are sitting idle because of the dependency on neighboring block's data. During intra block processing, neighboring reconstructed pixels are required for prediction of the current block. Hence, the processing of the current block cannot start until the neighboring blocks' boundary pixels are fully reconstructed. The techniques described herein offer the strategy to keep the encoding pipeline running by interleaving color components, various modes, and transform sizes to create a large amount of non-dependent data. By using these techniques, performance for video encoders can be increased without any increase in hardware resources or loss of compression efficiency. The techniques are applicable to hardware encoders as well as multi-core software encoders. These and further aspects are discussed below with respect to the drawings.

FIG. 1A is a block diagram depicting a video encoder 100 according to an example. The video encoder 100 includes an estimation circuit 102 and an encoding circuit 104. The estimation circuit 102 receives input video data (e.g., YUV data). An output of the estimation circuit 102 is coupled to an input of the encoding circuit 104. The estimation circuit 102 provides a best encoding choice to the encoding circuit 104. Another input of the encoding circuit 104 receives the input video data (e.g., the YUV data). An output of the encoding circuit 104 provides a compressed bitstream. Another output of the encoding circuit 104 provides feedback to the estimation circuit 102. The estimation circuit 102 is configured to test various intra/inter modes and transform sizes for a given block of video data. The estimation circuit 102 sends the best encoding choices to the encoding circuit 104, which is configured to encode the input video data based on the selected video encoding technique using the selected encoding choices of the estimation circuit 102.

Figure 2:
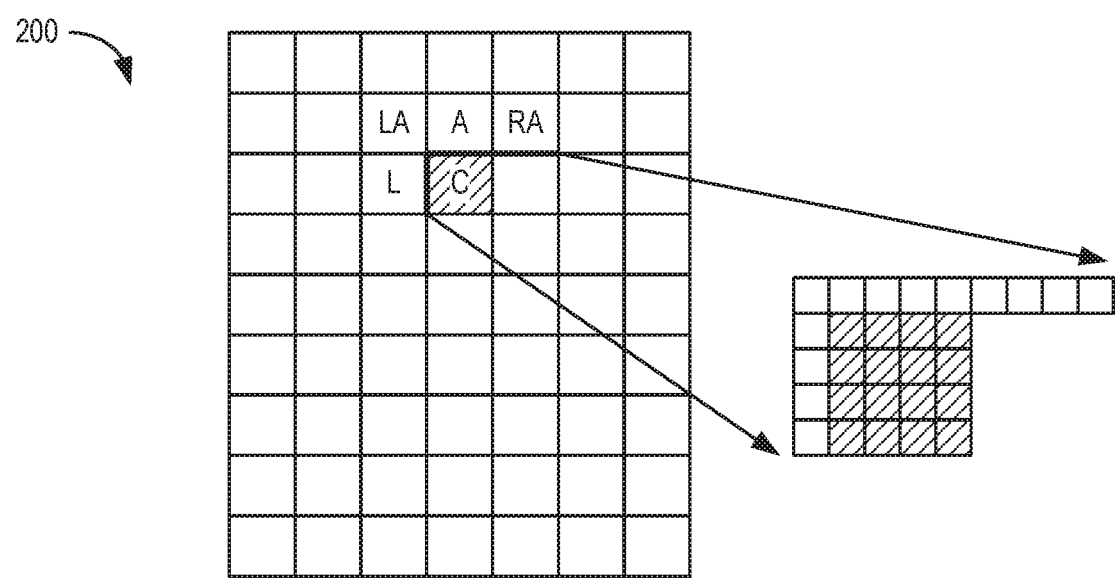
FIG. 2 is a block diagram depicting a video frame according to an example.

FIG. 2 is a block diagram depicting a video frame 200 according to an example. The input video data (e.g., YUV data) is divided into frames. Each frame is divided into blocks. During processing by the video encoder 100, some blocks of a frame are already reconstructed; other blocks of the frame are being encoded; and still other blocks of the frame are yet to be encoded. Each block includes an array of image pixels (e.g., a 4×4 array of image pixels). During prediction, neighboring left, above-left, and above-right image pixels are used for a given block.

Intra block coding can choose between multiple Intra prediction modes and multiple transform sizes. For example, VP9 specification has 10 intra prediction modes and 4 (4/8/16/32) transform sizes. The estimation circuit 102 can employ Rate Distortion Optimization (RDO) for selection of best intra mode and transform size to achieve high coding efficiency. Various combinations of modes and transforms make the estimation circuit 102 highly compute intensive. RDO is based on Lagrange multiplier method:

$$J=D+\lambda *R$$

Where λ is Lagrangian multiplier, D is distortion calculated as Sum of Squared Difference(SSD) between the reconstructed pixels and original pixels, and R is the number of bits taken to encode residue coefficients and mode bits. J is generally referred as RDO cost and the chosen mode has minimum RDO cost. Lower distortion signifies lesser deviation from original source input hence better quality, whereas lesser bits signify better compression. Difference between the reconstructed and original pixels is caused by the quantization of transform coefficients. Quantization step is determined by the rate control algorithm, which is a key step for achieving target bitrates in video encoders.

Due to high complexity of the RDO process, most of the real time Video encoders performs Intra estimation in two steps, Coarse Intra Estimation (CIE) and Fine Intra Estimation (FIE). During CIE, actual RDO is not performed and a list of 2-4 winner Intra modes is prepared by using some low-cost method. This list of winner Intra modes is provided to FIE step, where actual RDO process is performed, to find out the best Intra mode and transform size. FIE step is highly compute intensive process and generally creates the bottlenecks in encoder's performance due to dependency on neighboring data. Proposed techniques described herein reduce the dependencies and achieve better performances as described further below.

The benefit of Intra prediction in video coding is well known and it has been used in all advanced video coding schemes such as H264, VP8, HEVC, VP9, AV1 etc. Of-course it differs in number of modes (directions), transform sizes and prediction pixel computation (fir-filtering) in different specifications, but in terms of implementation constraints affecting performance, challenges are same—dependency on neighboring blocks for prediction data. Requirement of neighboring pixels creates the data dependency between the blocks. Current block(C) has dependency on the pixels of left block(L), left-above block (LA), above block (A) and right-above block (RA) for its prediction. So, encoder processing of block 'C' can only start after availability of all neighboring block's reconstructed pixels. This dependency on reconstructed pixels of prior blocks adds latency for start of next block's processing and eventually most of the time some of the encoding blocks are idle and waiting for reconstructed data to be available.

Figure 1B:
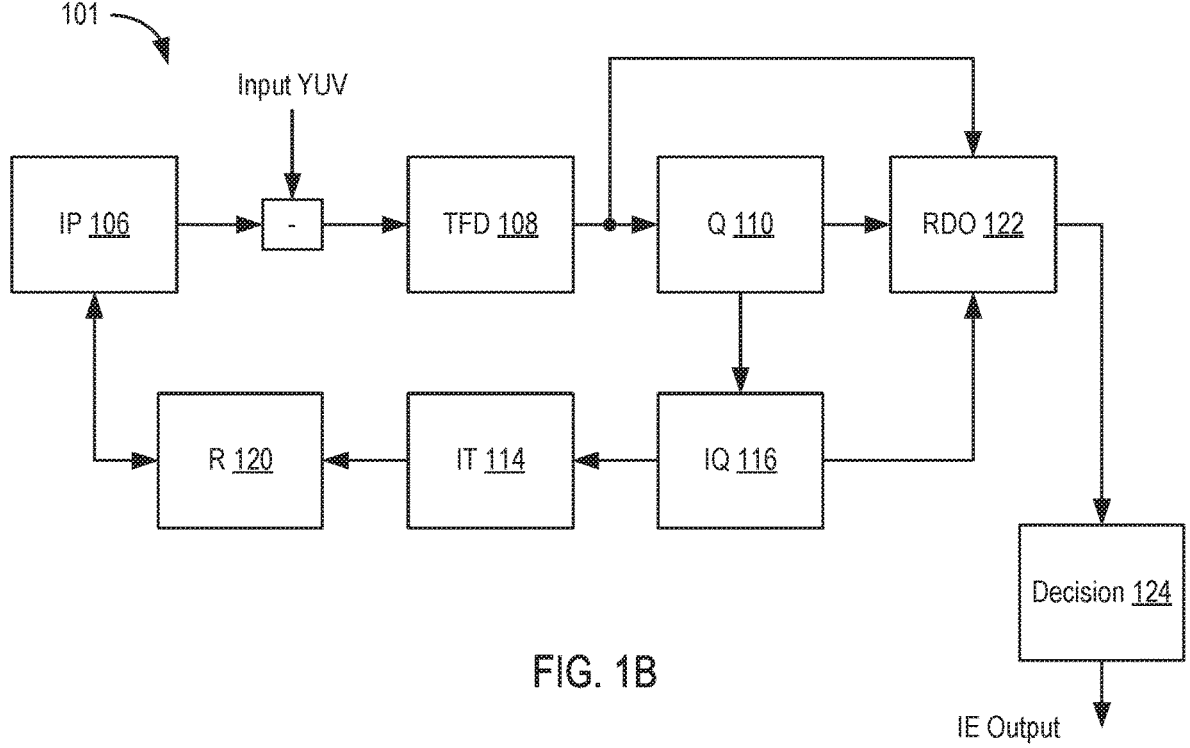
FIG. 1B is a block diagram depicting a pipeline for intra-estimation (IE) according to an example.

FIG. 1B is a block diagram depicting a pipeline 101 for intra-estimation (IE) according to an example. The IE pipeline 101 can be in the estimation circuit 102, the encoding circuit 104, or both. The IE pipeline includes various blocks. An Intra Prediction (IP) circuit 106 is connected to a subtractor 118, which is in turn connected to a Transformation Frequency Domain (TFD) circuit 108. IP circuit 106 generates predicted pixels. Subtractor 118 feeds the residual (difference of source pixels from the input YUV and prediction pixels) to the TFD circuit 108, which transforms the residual into frequency domain. Transform coefficients are quantized in Quantization (Q) circuit 110. After that, quantized coefficients are inverse quantized in Inverse Quantization (IQ) circuit 116 and Inverse transformed by the inverse transform (IT) circuit 114 to generate the reconstructed residual. A reconstruction (R) circuit 120 adds the reconstructed residual and predicted pixels (from the IP 106) to generate the reconstructed pixels. Thereafter, these reconstructed pixels are used by the IP circuit 106 to generate the prediction buffer for next block. In summary, residual data in pipeline 101 traverses through the chain of processing circuits IP→TFD→Q→IQ→IT→R→IP. This chain starts with IP circuit 106 and terminates at the R circuit 120 and since the prediction unit for a given block is waiting for reconstructed pixels of previous block, most of the time some of the processing blocks in pipeline remain idle. This leads to underutilization of hardware/processing resources and impacts overall encoder's performance. Rate Distortion Optimization (RDO) circuit 122 computes the distortion and the bits estimation of a block to be encoded for a given encoding choice. It takes the data from the TFD circuit 108 and IQ circuit 116 to compute the distortion of the block. It also receives the quantized coefficients from Q circuit 110 to estimate the bits required to encode the given block. From distortion and bits estimate it compute the final cost (J) according to the Lagrange multiplier method as described with regard to FIG. 2. Final cost (J) is sent to the Decision circuit 124 which compares the cost of all available choices and finally selects the choice which has minimum encoding cost (J).

In the techniques described herein, various Intra modes, transform sizes and color components (Y,Cr,Cb) are arranged in a special order to have minimal pipeline stalled blocks. For example, Luma and Chroma data has no dependency on each other, so they can be pushed in consecutive cycles in the encoding pipeline. The scheme of interleaving Luma and Chroma blocks is named as Luma Chroma Interleave (LCI). Similarly, during estimation stage many Intra modes are tested to determine the best Intra mode in sequential order. In the proposed method, different Intra Modes are also interleaved along with color components. This scheme is named as Intra Mode Interleave (IMI). Both the schemes are explained below in detail. Similarly, many transform sizes are tested to determine the best transform size in sequential order. In the proposed method, different transform sizes are also interleaved along with color components (LCI) and intra modes (IMI).

Luma Chroma Interleave (LCI) Scheme

Figure 3:
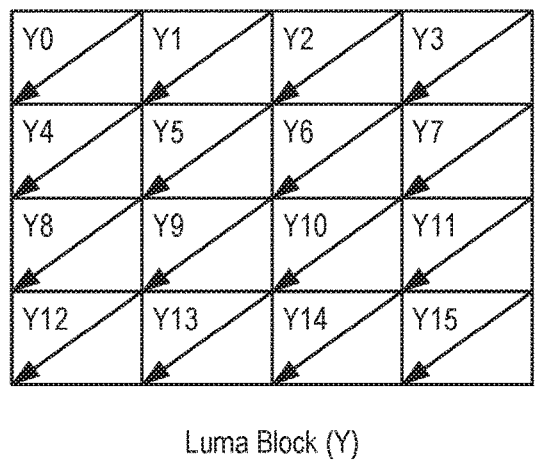
FIG. 3 depicts a processing order for pixel blocks according to an example.
Figure 3:
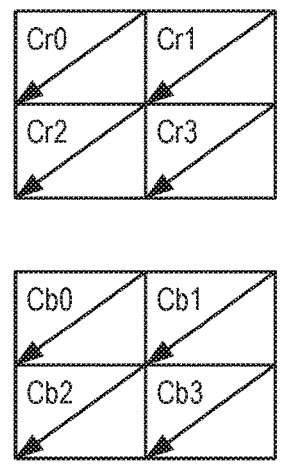
Figure 3:
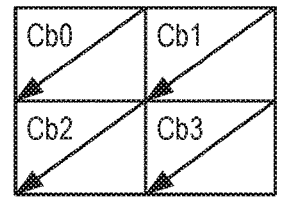

FIG. 3 depicts a processing order for pixel blocks according to an example. In FIG. 3, a diagonal processing order is shown for sixteen 4×4 blocks (e.g, a 16×16 block of pixels). In Table-1, a grouping of blocks is shown for which no wait is required, and they can be pushed consecutively in the pipeline 101. It is also shown that when diagonal processing is performed, the pipeline 101 is stalled 12 times (Luma and Chroma both), while in the LCI scheme the pipeline 101 is stalled only 6 times. That is, in Table 1, the different steps are divided based on data dependency between the blocks. Blocks in the same step do not have data dependency. In the diagonal order case, all the blocks are processed in 13 steps, meaning the pipeline is stalled 12 times. In the techniques described herein, all the blocks are processed in 7 steps, meaning the pipeline is stalled only 6 times. The LCI scheme exploits the non-dependency of color components.

TABLE 1

| | Diagonal order | Cycles taken at each step | Techniques described herein | Cycles taken at each step |
|---|---|---|---|---|
| Step1 | Y0 | 5 | Y0, Cr0, Cb0 | 7 |
| Step2 | Y1, Y4 | 6 | Y1, Y4, Cr1, Cb1 | 8 |
| Step3 | Y2, Y5, Y8 | 7 | Y2, Y5, Y8 | 7 |
| Step4 | Y3, Y6, Y9, Y12 | 8 | Y3, Y6, Y9, Y12 | 8 |
| Step5 | Y7, Y10, Y13 | 7 | Y7, Y10, Y13 | 7 |
| Step6 | Y11, Y14 | 6 | Y11, Y14, Cr2, Cb2 | 8 |
| Step7 | Y15 | 5 | Y15, Cr3, Cb3 | 7 |
| Step8 | Cr0 | 5 | | |
| Step9 | Cr1, Cr2 | 6 | | |
| Step10 | Cr3 | 5 | | |
| Step11 | Cb0 | 5 | | |
| Step12 | Cb1, Cb2 | 6 | | |
| Step13 | Cb3 | 5 | | |
| Total Cycles | | 76 | | 52 |

Figure 4:
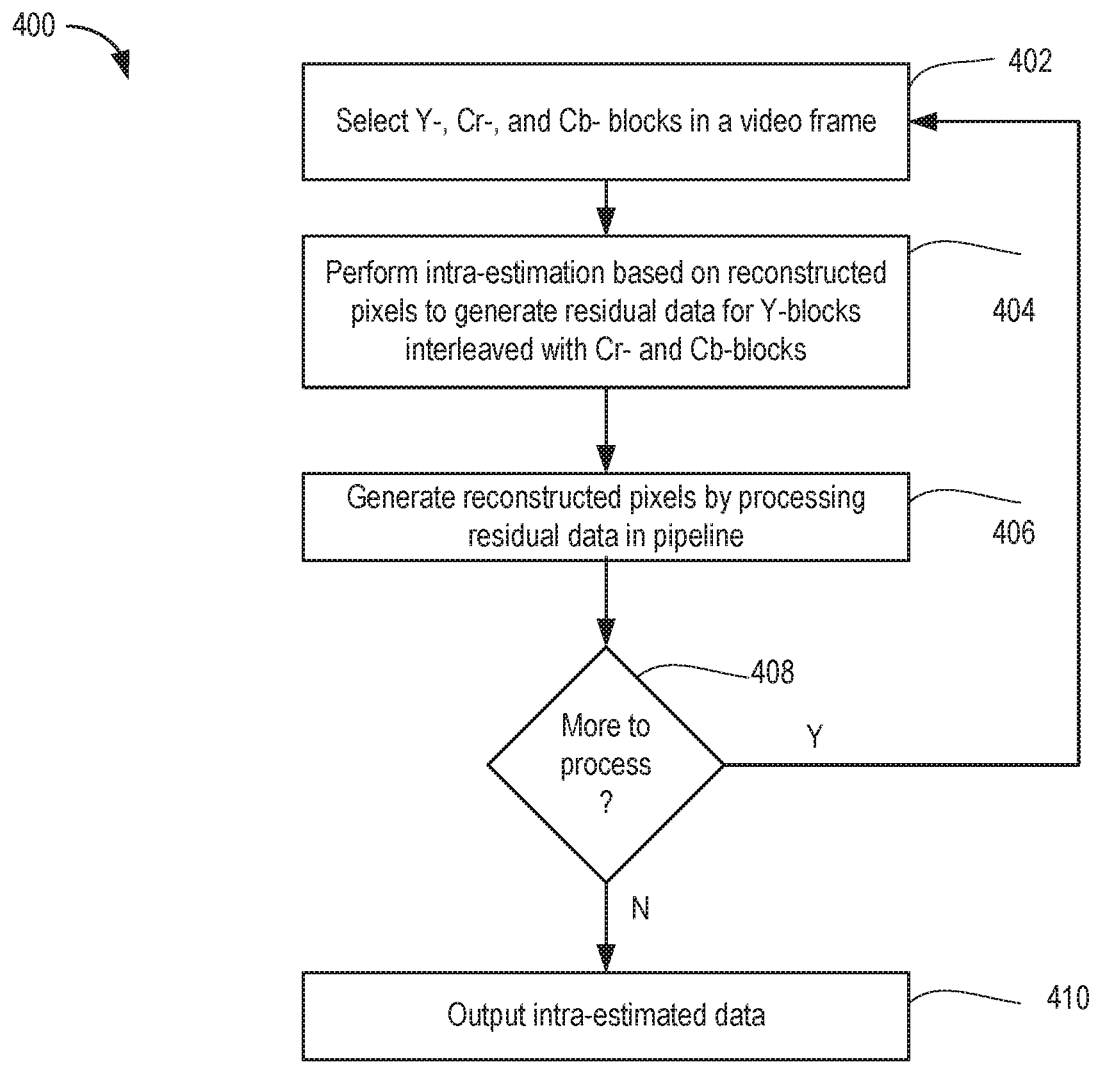
FIG. 4 is a flow diagram depicting a method of processing YUV data according to an example.

FIG. 4 is a flow diagram depicting a method 400 of processing YUV data according to an example. The method 400 performs the LCI scheme described above. At step 402, Y-, Cr-, and Cb-blocks are selected in the video frame. For example, Y0, Cr0, and Cb0. At step 404, intra-prediction is performed based on reconstructed pixels of left and top neighboring blocks to generate residual data for Y-blocks interleaved with Cr- and Cb-blocks. At step 406, the pipeline 101 generates reconstructed pixels by processing the residual data. Since there is no dependency among the Y-, Cr-, and Cb-blocks, the blocks are processed in consecutive cycles of the pipeline such that there are no stalls in the pipeline. At step 408, a determination is made as to whether there are more blocks in the frame to be processed. If so, the method 400 returns to step 402 and repeats. Otherwise, the method 400 ends at step 410, where the intra-estimated data from the frame is output.

Intra Mode Interleave (IMI) Scheme

In the LCI scheme, the non-dependency of color components is exploited to provide for efficient use of the pipeline. In the IMI scheme, non-dependency of various intra-modes is exploited. The IMI scheme for four intra-modes is shown in Table 2 below.

TABLE 2

| Cycles | C0 | C1 | C2 | C3 | C4 | C5 | C6 | C7 | C8 |
|---|---|---|---|---|---|---|---|---|---|
| IntraMode1 | IP | T | Q | IQ | IT | R | | | |
| IntraMode2 | | IP | T | Q | IQ | IT | R | | |
| IntraMode3 | | | IP | T | Q | IQ | IT | R | |
| IntraMode4 | | | | IP | T | Q | IQ | IT | R |

As shown in Table 2, encoding cycles C0-C8 are shown for the different pipeline stages of transform (T), quantize (Q), inverse quantize (IQ), inverse transform (IT), and pixel reconstruction (R). The intra-estimation process is performed for four different intra-modes. Since the different intra-modes do not depend on each other, the residual data for the different intra-modes is processed in consecutive cycles (C0-C3) of the pipeline without stalling.

Figure 5:
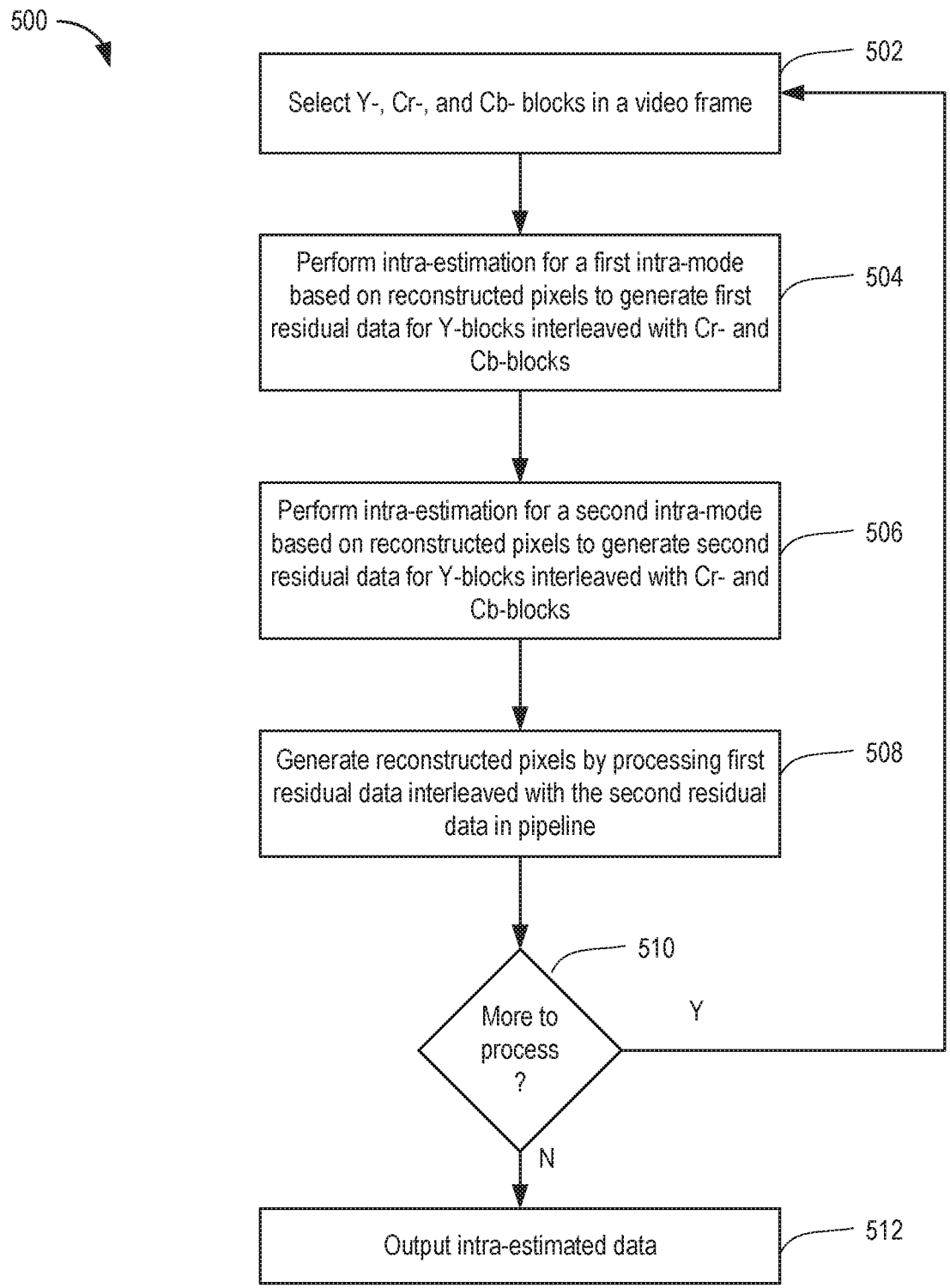
FIG. 5 is a flow diagram depicting a method of processing YUV data according to another example.

FIG. 5 is a flow diagram depicting a method 500 of processing YUV data according to an example. The method 500 performs the LCI scheme described above along with the IMI scheme. At step 502, Y-, Cr-, and Cb-blocks are selected in the video frame. At step 504, intra-estimation is performed for a first intra-mode based on reconstructed pixels to generate first residual data for Y-blocks interleaved with Cr- and Cb-blocks. At step 506, intra-estimation is performed for a second intra-mode based on reconstructed pixels to generate second residual data for Y-blocks interleaved with Cr- and Cb-blocks. In some examples, steps 504 and 506 can be performed concurrently. At step 508, the pipeline 101 generates next reconstructed pixels by processing the first residual data interleaved with the second residual data. Since there is no dependency among the intra-modes, the first and second residual data are processed in consecutive cycles of the pipeline such that there are no stalls in the pipeline. At step 510, a determination is made as to whether there are more blocks in the frame to be processed. If so, the method 500 returns to step 502 and repeats. Otherwise, the method 500 ends at step 512, where the intra-estimated data from the frame is output. While the method 500 is described with respect to two intra-modes, it is to be understood that the method 500 can be extended to perform intra-estimation using the IMI scheme for any number of intra-modes (e.g., four intra-modes as shown in Table 2).

Transform Size Interleave Scheme

Figure 6:
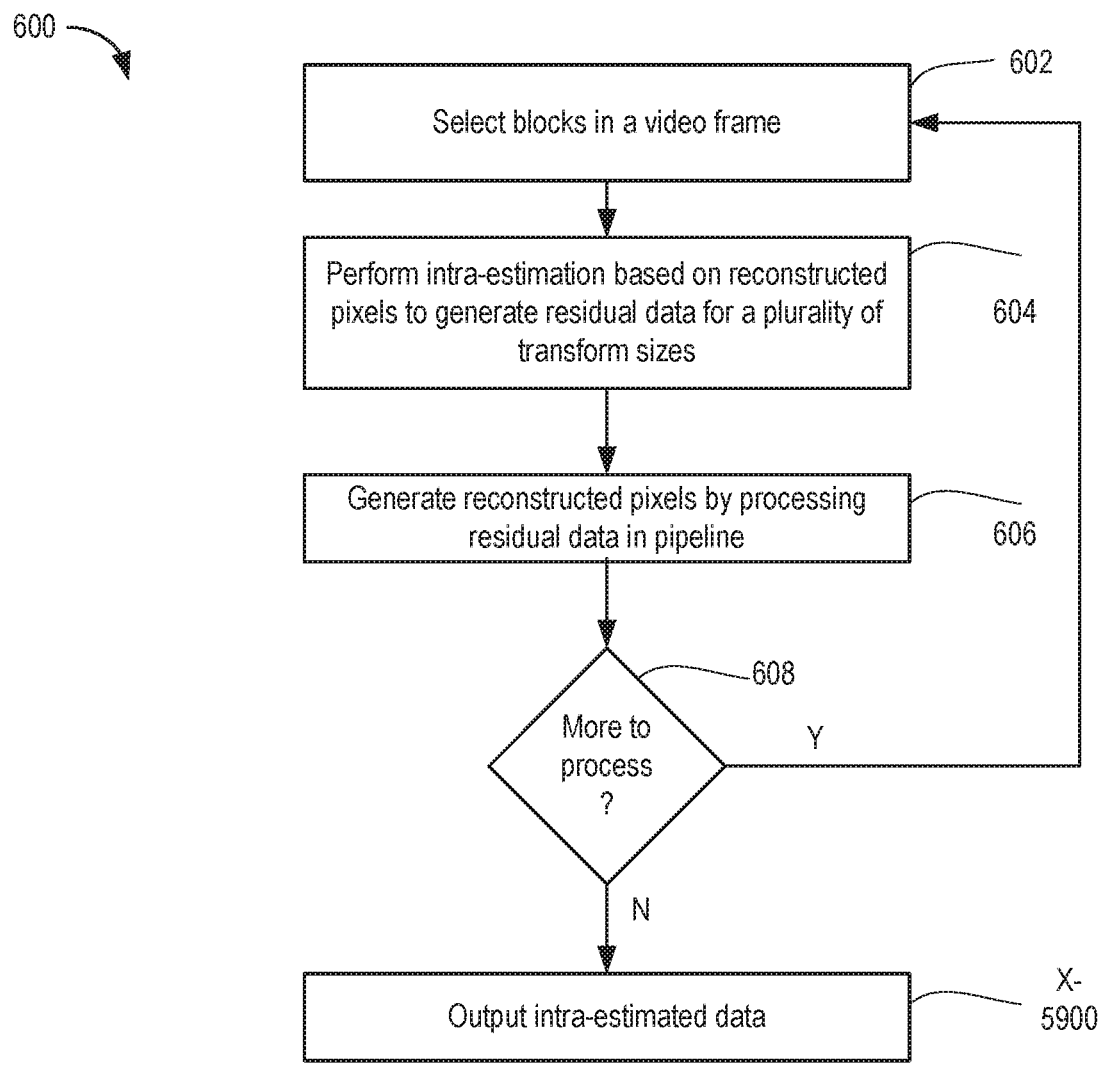
FIG. 6 is a flow diagram depicting a method of processing YUV data according to an example.
Figure 6A:
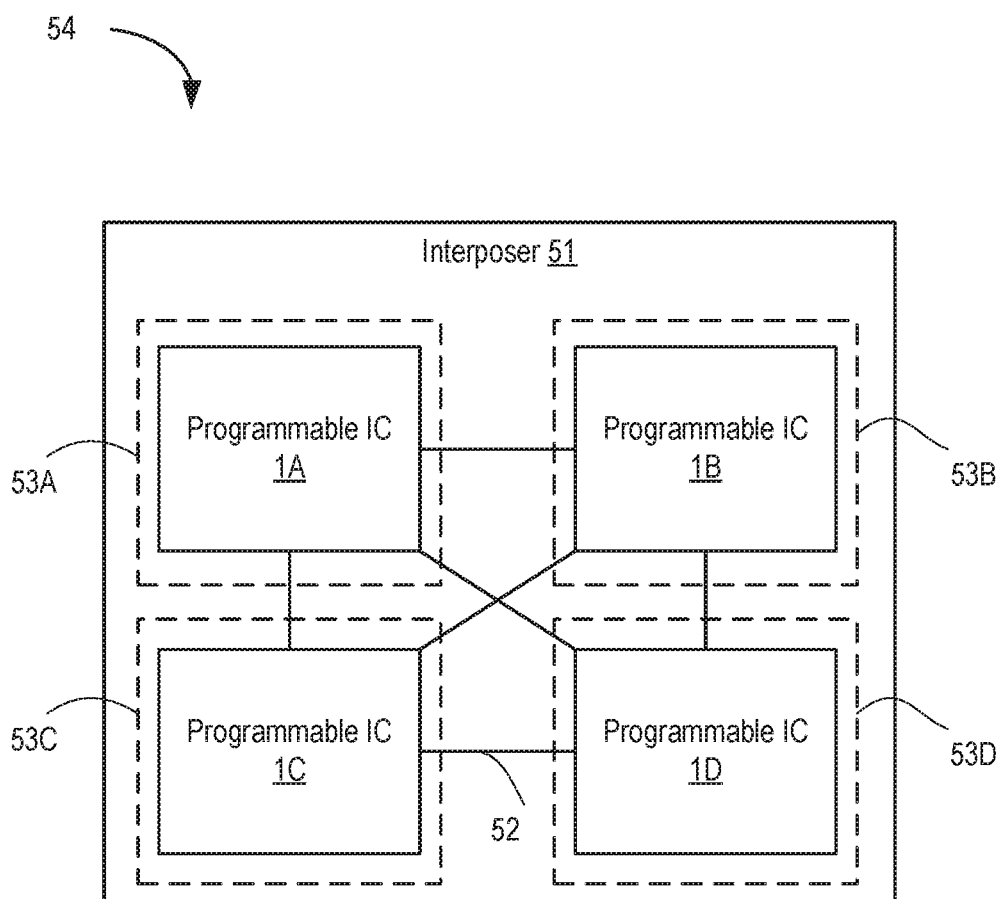
Figure 6B:
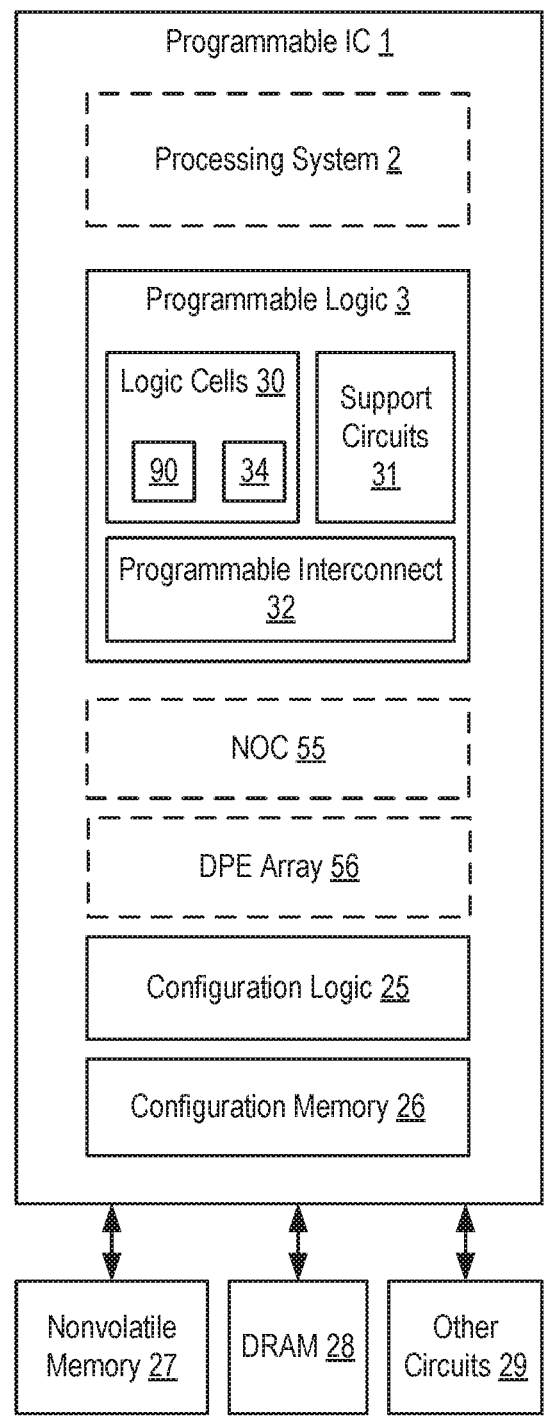
Figure 6C:
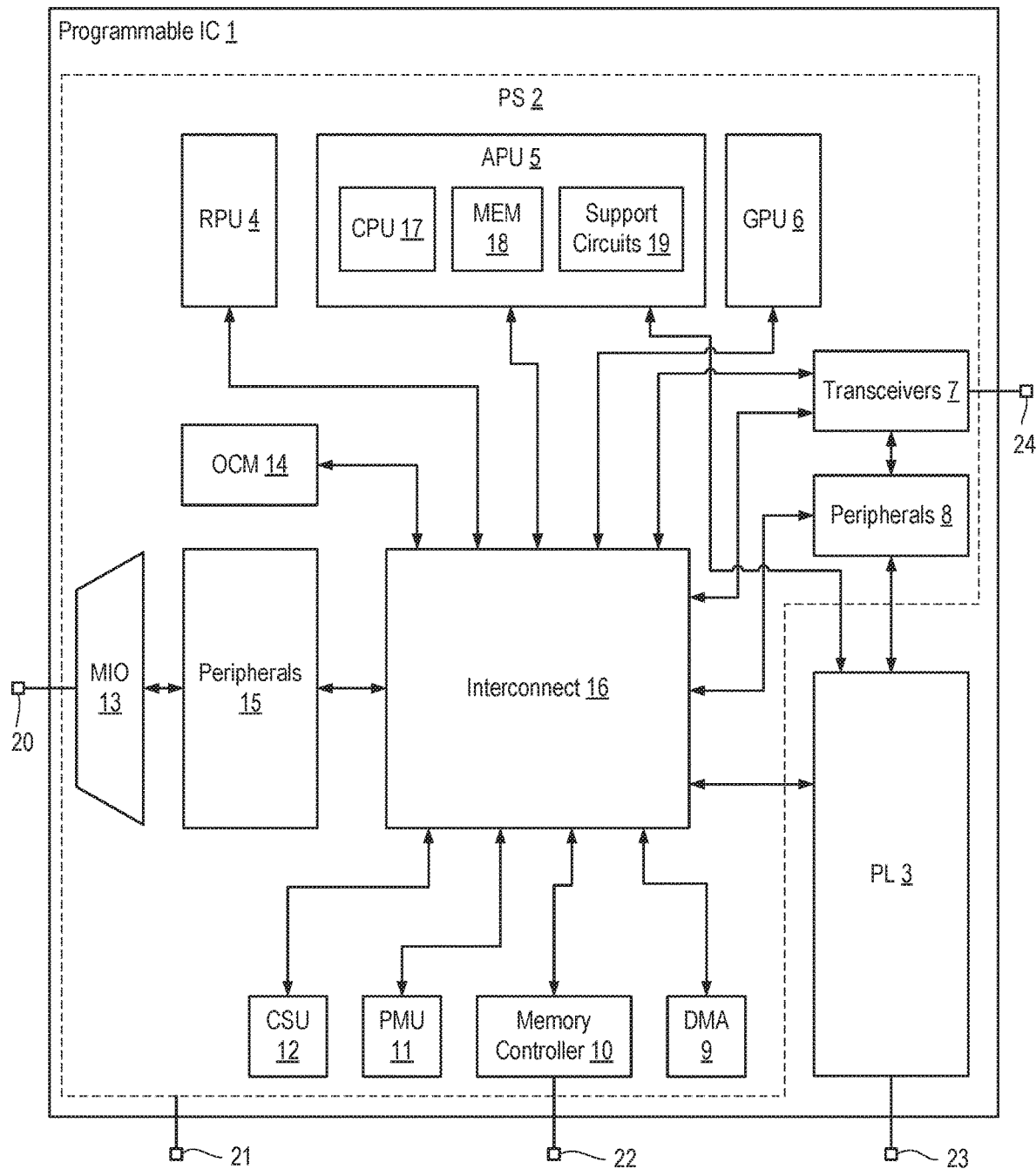

FIG. 6 is a flow diagram depicting a method 600 of processing YUV data according to an example. The method 600 performs a transform size interleave scheme. At step 602, Y-, Cr-, and Cb-blocks are selected in the video frame. At step 604, intra-prediction is performed based on reconstructed pixels of left and top neighboring blocks to generate residual data for the blocks using a plurality of transform sizes. At step 606, the pipeline 101 generates reconstructed pixels by processing the residual data. Since there is no dependency among the blocks using different transform sizes, the blocks are processed in consecutive cycles of the pipeline such that there are no stalls in the pipeline. At step 608, a determination is made as to whether there are more blocks in the frame to be processed. If so, the method 600 returns to step 602 and repeats. Otherwise, the method 600 ends at step 610, where the intra-estimated data from the frame is output.

Figure 7A:
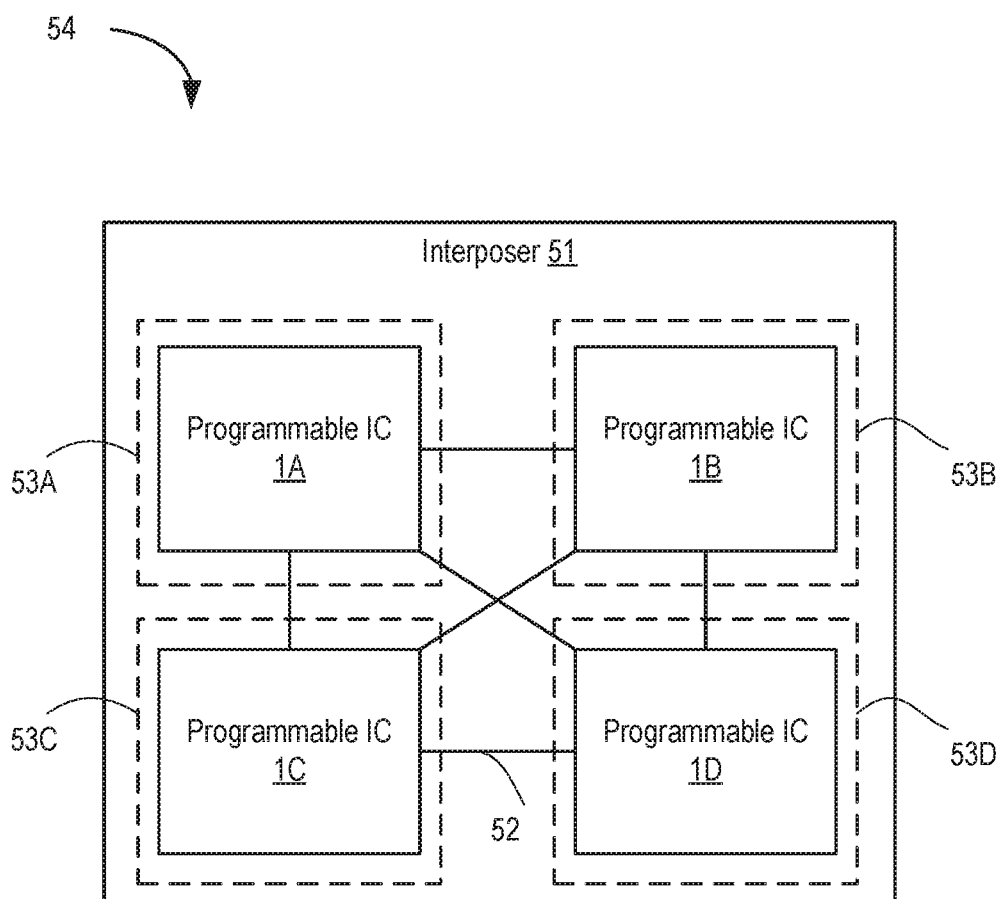
FIG. 7A is a block diagram depicting a programmable device according to an example.

FIG. 7A is a block diagram depicting a programmable device 54 that can be used to implement the intra-estimation techniques described herein according to an example. The programmable device 54 includes a plurality of programmable integrated circuits (ICs) 1, e.g., programmable ICs 1A, 1B, 1C, and 1D. In an example, each programmable IC 1 is an IC die disposed on an interposer 51. Each programmable IC 1 comprises a super logic region (SLR) 53 of the programmable device 54, e.g., SLRs 53A, 53B, 53C, and 53D. The programmable ICs 1 are interconnected through conductors on the interposer 51 (referred to as super long lines (SLLs) 52).

Figure 7B:
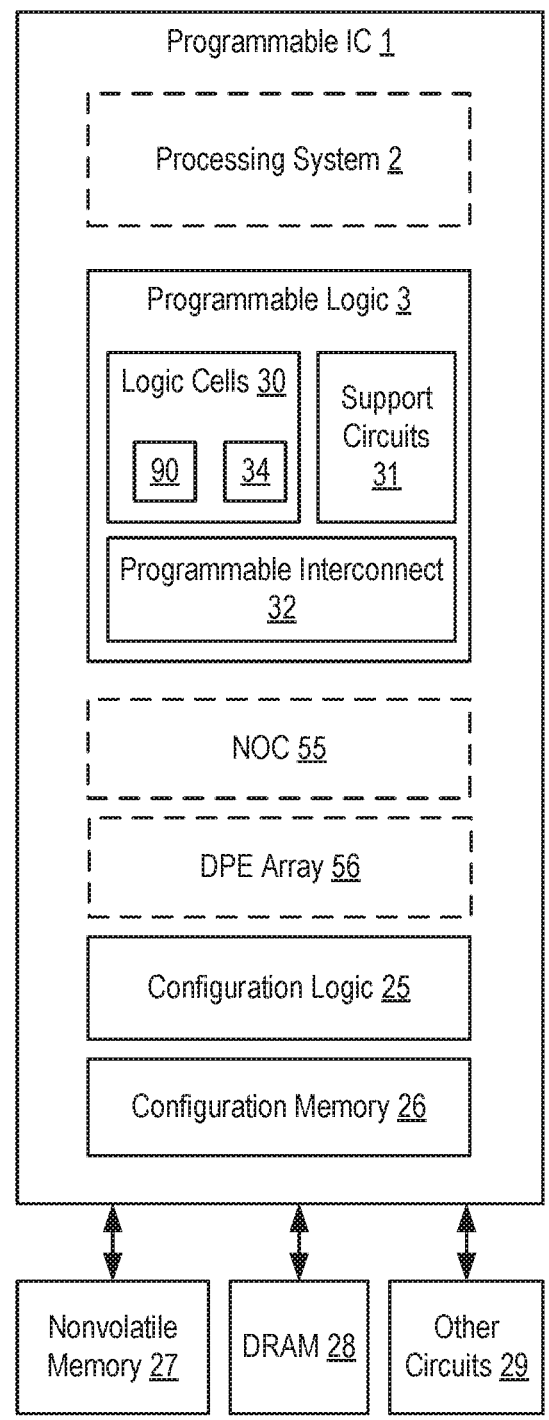
FIG. 7B is a block diagram depicting a programmable IC according to an example.

FIG. 7B is a block diagram depicting a programmable IC 1 according to an example. The programmable IC 1 can be used to implement one of the programmable ICs 1A-1D in the programmable device 54. The programmable IC 1 includes programmable logic (PL) 3 (also referred to as a programmable fabric), configuration logic 25, and configuration memory 26. The programmable IC 1 can be coupled to external circuits, such as nonvolatile memory 27, DRAM 28, and other circuits 29. The programmable logic 3 includes logic cells 30, support circuits 31, and programmable interconnect 32. The logic cells 30 include circuits that can be configured to implement general logic functions of a plurality of inputs. The support circuits 31 include dedicated circuits, such as transceivers, input/output blocks, digital signal processors, memories, and the like. The logic cells and the support circuits 31 can be interconnected using the programmable interconnect 32. Information for programming the logic cells 30, for setting parameters of the support circuits 31, and for programming the programmable interconnect 32 is stored in the configuration memory 26 by the configuration logic 25. The configuration logic 25 can obtain the configuration data from the nonvolatile memory 27 or any other source (e.g., the DRAM 28 or from the other circuits 29). In some examples, the programmable IC 1 includes a processing system (PS) 2. The processing system 2 can include microprocessor(s), memory, support circuits, IO circuits, and the like. In some examples, the programmable IC 1 includes a network-on-chip (NOC) 55 and data processing engine (DPE) array 56. The NOC 55 is configured to provide for communication between subsystems of the programmable IC 1, such as between the PS 2, the PL 3, and the DPE array 56. The DPE array 56 can include an array of DPE's configured to perform data processing, such as an array of vector processors.

Figure 7C:
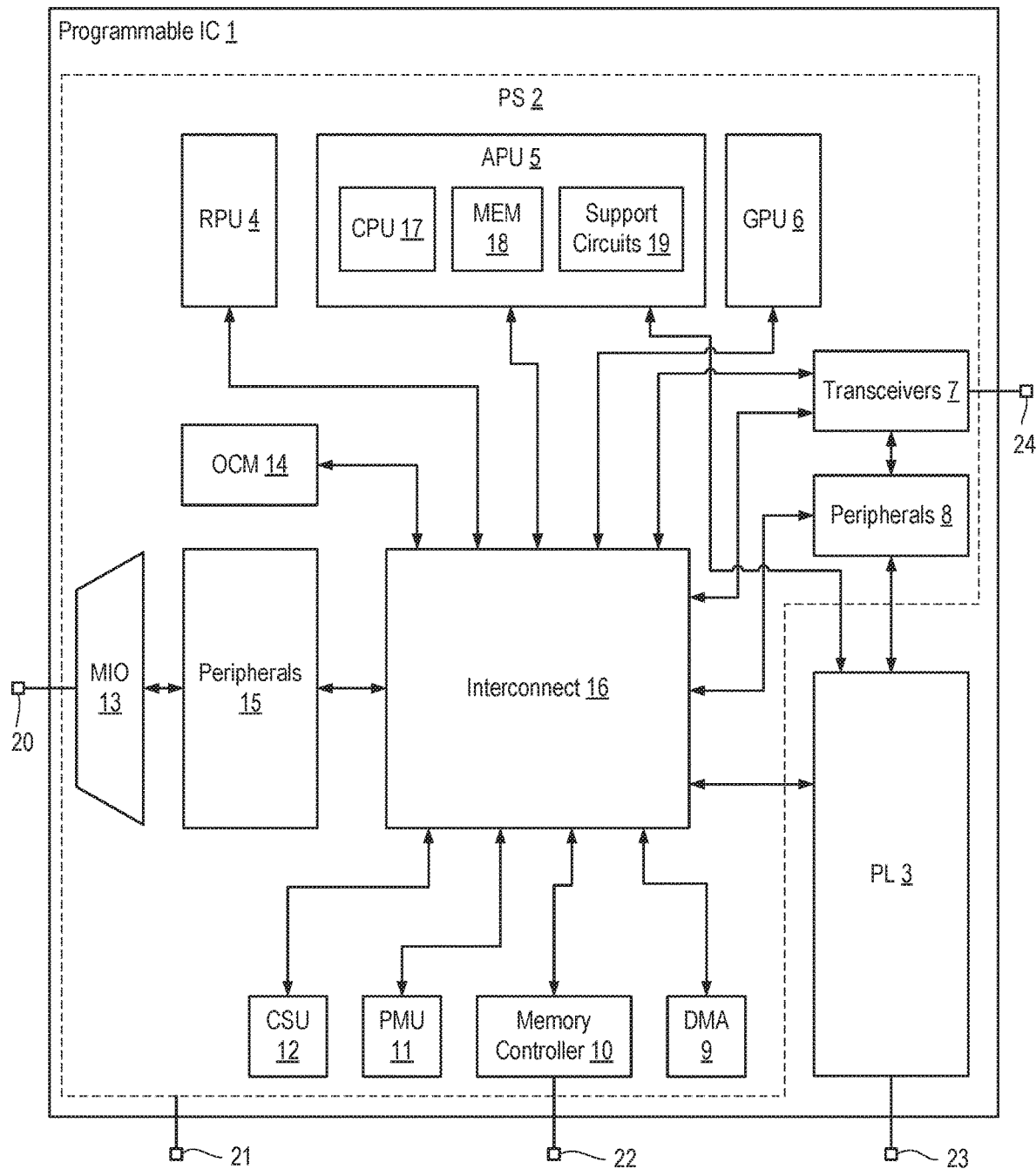
FIG. 7C is a block diagram depicting an SOC implementation of the programmable IC according to an example.

FIG. 7C is a block diagram depicting an SOC implementation of the programmable IC 1 according to an example. In the example, the programmable IC 1 includes the processing system 2 and the programmable logic 3. The processing system 2 includes various processing units, such as a real-time processing unit (RPU) 4, an application processing unit (APU) 5, a graphics processing unit (GPU) 6, a configuration and security unit (CSU) 12, a platform management unit (PMU) 122, and the like. The processing system 2 also includes various support circuits, such as on-chip memory (OCM) 14, transceivers 7, peripherals 8, interconnect 16, DMA circuit 9, memory controller 10, peripherals 15, and multiplexed 10 (MIO) circuit 13. The processing units and the support circuits are interconnected by the interconnect 16. The PL 3 is also coupled to the interconnect 16. The transceivers 7 are coupled to external pins 24. The PL 3 is coupled to external pins 23. The memory controller 10 is coupled to external pins 22. The MIO 13 is coupled to external pins 20. The PS 2 is generally coupled to external pins 21. The APU 5 can include a CPU 17, memory 18, and support circuits 19.

Referring to the PS 2, each of the processing units includes one or more central processing units (CPUs) and associated circuits, such as memories, interrupt controllers, direct memory access (DMA) controllers, memory management units (MMUs), floating point units (FPUs), and the like. The interconnect 16 includes various switches, busses, communication links, and the like configured to interconnect the processing units, as well as interconnect the other components in the PS 2 to the processing units.

The OCM 14 includes one or more RAM modules, which can be distributed throughout the PS 2. For example, the OCM 14 can include battery backed RAM (BBRAM), tightly coupled memory (TCM), and the like. The memory controller 10 can include a DRAM interface for accessing external DRAM. The peripherals 8, 15 can include one or more components that provide an interface to the PS 2. For example, the peripherals 15 can include a graphics processing unit (GPU), a display interface (e.g., DisplayPort, high-definition multimedia interface (HDMI) port, etc.), universal serial bus (USB) ports, Ethernet ports, universal asynchronous transceiver (UART) ports, serial peripheral interface (SPI) ports, general purpose 10 (GPIO) ports, serial advanced technology attachment (SATA) ports, PCIe ports, and the like. The peripherals 15 can be coupled to the MIO 13. The peripherals 8 can be coupled to the transceivers 7. The transceivers 7 can include serializer/deserializer (SERDES) circuits, multi-gigabit transceivers (MGTs), and the like.

Figure 7D:
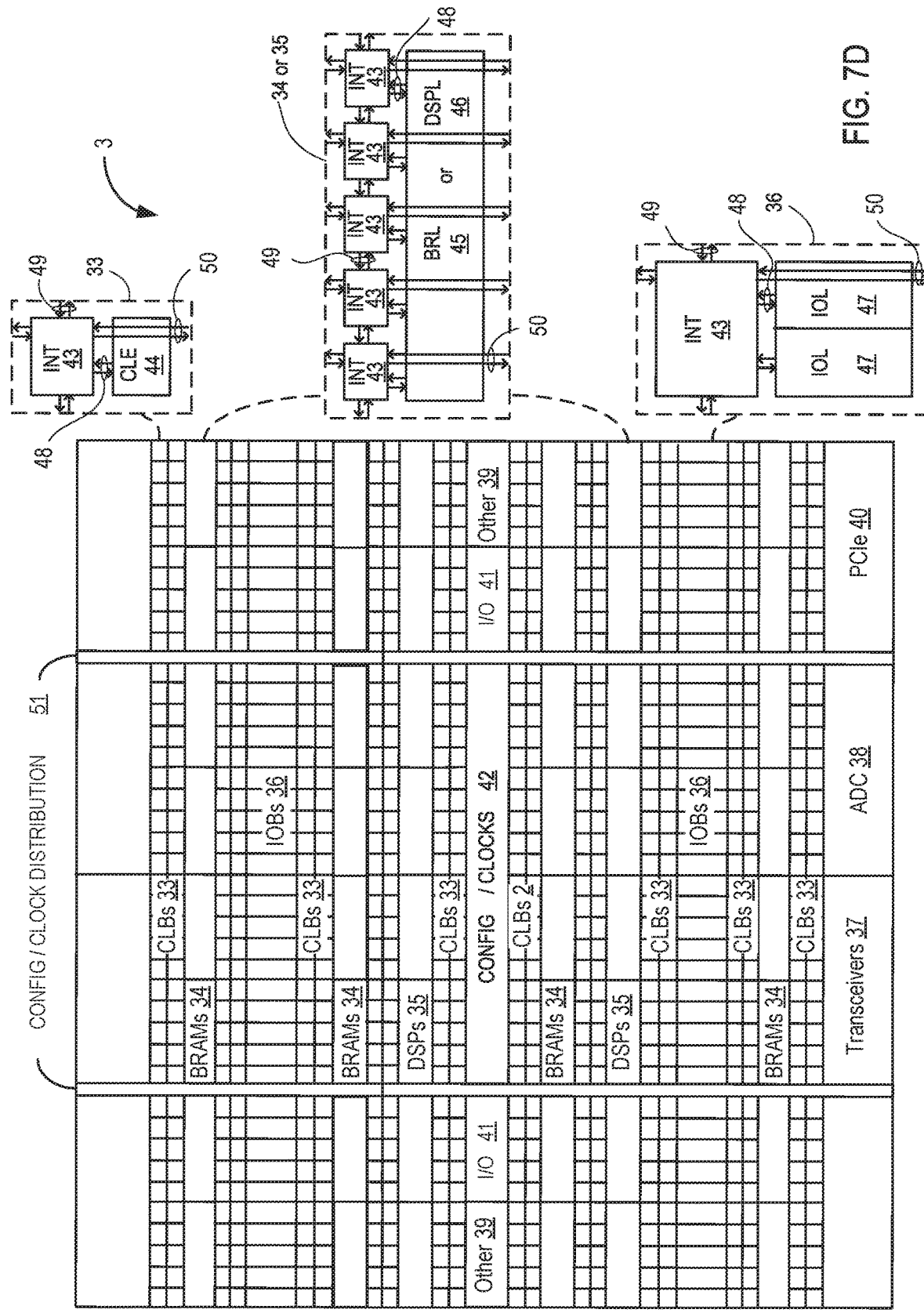
FIG. 7D illustrates a field programmable gate array (FPGA) implementation of the programmable IC according to an example.

FIG. 7D illustrates a field programmable gate array (FPGA) implementation of the programmable IC 1 that includes the PL 3. The PL 3 shown in FIG. 6D can be used in any example of the programmable devices described herein. The PL 3 includes a large number of different programmable tiles including transceivers 37, configurable logic blocks ("CLBs") 33, random access memory blocks ("BRAMs") 34, input/output blocks ("IOBs") 36, configuration and clocking logic ("CONFIG/CLOCKS") 42, digital signal processing blocks ("DSPs") 35, specialized input/output blocks ("I/O") 41 (e.g., configuration ports and clock ports), and other programmable logic 39 such as digital clock managers, analog-to-digital converters, system monitoring logic, and so forth. The PL 3 can also include PCIe interfaces 40, analog-to-digital converters (ADC) 38, and the like.

In some PLs, each programmable tile can include at least one programmable interconnect element ("INT") 43 having connections to input and output terminals 48 of a programmable logic element within the same tile, as shown by examples included at the top of FIG. 6D. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated PL.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An IOB 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die (shown in FIG. 3D) is used for configuration, clock, and other control logic. Vertical columns 51 extending from this horizontal area or column are used to distribute the clocks and configuration signals across the breadth of the PL.

Some PLs utilizing the architecture illustrated in FIG. 7D include additional logic blocks that disrupt the regular columnar structure making up a large part of the PL. The additional logic blocks can be programmable blocks and/or dedicated logic. Note that FIG. 7D is intended to illustrate only an exemplary PL architecture. For example, the numbers of logic blocks in a row, the relative width of the rows, the number and order of rows, the types of logic blocks included in the rows, the relative sizes of the logic blocks, and the interconnect/logic implementations included at the top of FIG. 7D are purely exemplary. For example, in an actual PL more than one adjacent row of CLBs is typically included wherever the CLBs appear, to facilitate the efficient implementation of user logic, but the number of adjacent CLB rows varies with the overall size of the PL.

While the foregoing is directed to specific examples, other and further examples may be devised without departing from the basic scope thereof, and the scope thereof is determined by the claims that follow.

What is claimed is:

1. A method of encoding a video, comprising:
   selecting blocks of pixels in a frame of the video, the blocks having luminance (Y) blocks, red color difference (Cr) blocks, and blue color difference (Cb) blocks;
   performing intra-estimation for a first intra-mode based on first reconstructed pixels of the blocks of pixels to generate first predicted blocks;
   subtracting the first predicted blocks from the blocks of pixels to generate first residual data, the first residual data comprising respective first residual data for the Y-blocks interleaved with respective first residual data for the Cr-blocks and the Cb-blocks;
   performing intra-estimation for a second intra-mode based on second reconstructed pixels of the blocks of pixels to generate second predicted blocks;
   subtracting the second predicted blocks from the blocks of pixels to generate second residual data, the second residual data comprising respective second residual data for the Y-blocks interleaved with respective second residual data for the Cr-blocks and the Cb-blocks; and
   generating new reconstructed pixels using a pipeline of a video encoder by processing the first residual data for the blocks and the second residual data for the blocks, wherein the second residual data is interleaved with the first residual data.

2. The method of claim 1, wherein the blocks of pixels are selected from a coding unit (CU) depending on a transform size.

3. The method of claim 1, wherein the blocks of pixels are selected from a coding unit (CU) for a plurality of transform sizes, and wherein the first residual data comprises respective residual data for each of the plurality of transform sizes.

4. The method of claim 1, wherein the pipeline is disposed in an estimation stage of the video encoder.

5. The method of claim 1, wherein the pipeline is disposed in an encoding stage of the video encoder.

6. The method of claim 1, wherein the blocks of pixels are selected from a coding unit (CU) for a plurality of transform sizes, and wherein the first residual data and the second residual data comprise respective residual data for each of the plurality of transform sizes.

7. A video encoder, comprising:
   an estimation circuit configured to receive video frames;
   an encoder circuit, coupled to the estimation circuit, configured to receive the video frames and output of the estimation circuit; and
   an intra-estimation pipeline configured to:
   select blocks of pixels in a frame of the video frames, the blocks having luminance (Y) blocks, red color difference (Cr) blocks, and blue color difference (Cb) blocks;
   perform intra-estimation for a first intra-mode based on first reconstructed pixels to generate first residual data for the blocks, the first residual data comprising respective first residual data for the Y-blocks interleaved with respective first residual data for the Cr-blocks and the Cb-blocks;
   perform intra-estimation for a second intra-mode based on second reconstructed pixels to generate second residual data for the blocks, the second residual data comprising respective second residual data for the Y-blocks interleaved with respective second residual data for the Cr-blocks and the Cb-blocks; and
   generate new reconstructed pixels by processing the first residual data for the blocks and the second residual data for the blocks, wherein the second residual data is interleaved with the first residual data.

8. The video encoder of claim 7, wherein the intra-estimation pipeline is disposed in the estimation circuit.

9. The video encoder of claim 7, wherein the intra-estimation pipeline is disposed in the encoder circuit.

10. The video encoder of claim 7, wherein the blocks of pixels are selected from a coding unit (CU) for a plurality of transform sizes, and wherein the first residual data and the second residual data comprise respective residual data for each of the plurality of transform sizes.

11. The video encoder of claim 10, wherein residual data of the first residual data for a first transform size of the plurality of transform sizes is interleaved with residual data of the first residual data for a second transform size of the plurality of transform sizes, and wherein residual data of the second residual data for the first transform size of the plurality of transform sizes is interleaved with residual data of the second residual data for the second transform size of the plurality of transform sizes.

12. The video encoder of claim 7, wherein the blocks of pixels are selected from a coding unit (CU) depending on a transform size.

13. The video encoder of claim 7, wherein the blocks of pixels are selected from a coding unit (CU) for a plurality of transform sizes, and wherein the first residual data comprises respective residual data for each of the plurality of transform sizes.

14. The video encoder of claim 7, wherein, during a first at least one cycle of the intra-estimation pipeline, intra-estimation for the first intra-mode and intra-estimation for the second intra-mode are performed, and, during a second at least one cycle of the intra-estimation pipeline, intra-estimation for the first intra-mode is performed and intra-estimation for the second intra-mode is not performed.

15. A method of encoding a video, comprising:
  selecting blocks of pixels in a frame of the video, the blocks having luminance (Y) blocks, red color difference (Cr) blocks, and blue color difference (Cb) blocks;
  performing intra-estimation for a first intra-mode based on reconstructed pixels to generate first residual data for the blocks, the first residual data comprising respective first residual data for the Y-blocks in interleaved with respective first residual data for the Cr-blocks and the Cb-blocks;
  performing intra-estimation for a second intra-mode based on the reconstructed pixels to generate second residual data for the blocks, the second residual data comprising respective second residual data for the Y-blocks interleaved with respective second residual data for the Cr-blocks and the Cb-blocks; and
  generating new reconstructed pixels using a pipeline of a video encoder by processing the first residual data interleaved with the second residual data.

16. The method of claim 15, wherein the pipeline is disposed in an estimation stage of the video encoder.

17. The method of claim 15, wherein the blocks of pixels are selected from a coding unit (CU) depending on a transform size.

18. The method of claim 15, wherein the blocks of pixels are selected from a coding unit (CU) for a plurality of transform sizes, and wherein the first and the second residual data comprise respective residual data for each of the plurality of transform sizes.

19. The method of claim 18, wherein the pipeline is disposed in an estimation stage of the video encoder.

20. The method of claim 18, wherein the pipeline is disposed in an encoding stage of the video encoder.

* * * * *